Patented Feb. 16, 1954

2,669,550

UNITED STATES PATENT OFFICE 2,669,550

METHOD OF ELASTICIZING PLASTIC CARBOXYL CONTAINING SYNTHETIC POLYMERIC RUBBERY MATERIALS AND ELASTIC PRODUCTS PRODUCED THEREBY

Harold P. Brown, Akron, Ohio, assignor to The B. F. Goodrich Company, New York, N. Y., a corporation of New York No Drawing. Application November 24, 1950, Serial No. 197,495

14 Claims. (Cl. 260—23.7)

The present invention relates generally to synthetic rubber compositions and a method of making same and in particular to a method of producing elastic synthetic rubber compositions having a new and novel combination of properties among which are greatly superior tensile strength, modulus, and elongation, and improved ozone resistance, low temperature flexibility, and retention of stress-strain properties at elevated temperatures.

In my copending application Serial No. 193,521, filed November 1, 1951, I have disclosed that elastic synthetic rubbery materials of novel properties and great utility are produced by adding a polyvalent metallic oxide to a plastic carboxyl-containing rubbery polymeric material and then heating or "curing" at temperatures of 125 to 400° F. so as to bring about the reaction of the polyvalent metal oxide with the combined carboxyl (—COOH) groups of the rubbery material. It is pointed out therein that the elastic rubbery products are polymeric metallo-carboxylates formed by a polymeric condensation or salt-formation between the metallic cation of the metal oxide and the combined carboxyl (—COOH) groups of the rubbery material.

It has been noted, however, that the salt-formation reaction by which such polymeric metallo-carboxylates are formed is a very rapid reaction and oftentimes is very erratic with the result that a molded specimen, for example, will be wrinkled and distorted after being removed from the mold. The reaction occurs so readily that the mixture of the plastic carboxyl-containing rubbery material and the polyvalent metal oxide sometimes will cure-up or become somewhat stiff or elastic on standing at room temperature and the compositions will frequently "scorch" or precure during milling or other processing operations.

I have now discovered that the salt-forming or "curing" reaction between (1) a plastic synthetic polymeric rubbery material possessing carboxyl groups in its polymer structure and (2) a polyvalent metal oxide, may be "controlled" or improved such that scorching on shelf-aging or during processing does not so readily occur, and greatly improved polymeric metallo-carboxylates are obtained, by carrying out the salt-forming reaction in the presence of an added acidic substance selected from the class consisting of carboxylic acids and carboxylic acid anhydrides. In accordance with my discovery the acidic "controller" is added to the plastic carboxyl-containing rubbery material before, concurrently with, or after the addition of the metal oxide, although the preferred procedure is to add the acidic controller before or concurrently with the incorporation of the metal oxide. The mixture is then heated at 125 to 400° C. to yield polymeric metallo-carboxylates possessed of greatly improved properties as compared to the products produced without the addition of the controller.

The improvement in properties resulting from the use of the acidic "controller" is especially noted in the case of polymeric metallo-carboxylates produced from rubbery materials low in combined (polymer-bound) carboxyl (—COOH) groups, and manifests itself principally as a great increase in tensile strength and modulus over that obtained with the metal oxide alone. However, there is also marked improvement in properties of polymeric metallo-carboxylates prepared from rubbery materials high in combined (—COOH) content which improvement manifests itself not only as an increase in tensile strength but also principally as a more desirable balance between the physical properties of ultimate tensile strength, modulus of elasticity and ultimate elongation. In each case, the improvement in properties by the use of the acidic controller is also accompanied by greater ease in processability of the raw composition and in the production of smoother, more homogeneous elasticized compositions.

Any of the various carboxylic acids and carboxylic acid anhydrides including those which are monobasic and polybasic and those which are aliphatic and cyclic, whether aromatic, alicyclic or heterocyclic, may be utilized as reaction "controllers." Mixtures of several different acids and/or anhydrides may also be used. Illustrative compounds within this class include formic acid, acetic acid, butyric acid, caproic acid, caprylic acid, lauric acid, myristic acid, palmitic acid, stearic acid (preferred), nonadecanoic acid, behenic acid and other saturated aliphatic monocarboxylic acids and mixtures thereof; acrylic acid, furyl acrylic acid, methacrylic acid, crotonic acid, oleic acid, linoleic acid, ricinoleic acid, sorbic acid, and other unsaturated monocarboxylic acids; oxalic acid, malonic acid, succinic acid, glutaric acid, adipic acid, suberic acid, azelaic acid, sebacic acid (preferred), tricarballylic acid, citric acid, 4,8-dithia-6-oxahendecanedioic acid, 3,7-dithia nonandioic acid, and other saturated aliphatic dicarboxylic and polycarboxylic acids; maleic and fumaric acids, malic acid, glutaconic acid, muconic acid, and other unsaturated aliphatic di and polycarboxylic acids; benzoic acid, chlorobenzoic acid, p-aminobenzoic acid, o-aminobenzoic acid, phenylacetic acid, cinnamic acid, the toluic acids, naphthoic acid, cyclohexane acetic acid, furoic acid, and other monocarboxylic, aromatic, alicyclic and heterocyclic acids; phthalic acid (preferred), the chlorophthalic acids, isophthalic acid, 4-sulfophthalic acid, terephthalic acid, tetrahydrophthalic acid, hemimellitic acid, trimellitic acid, trimeric acid, naphthalic acid, cyclohexanediacetic acid, 2,2'-bis(4-carboxymethyl-phenyl) propane, and other polycarboxylic carbocyclic (aromatic) and cyclic acids; and the anhydrides of the above and other organic acids such as acetic anhydride, propionic anhydride, butyric anhydride, valeric anhydride, succinic anhydride, maleic anhydride, benzoic anhydride, phthalic anhydride, the chloro-phthalic anhydrides, tetrahydro phthalic anhydride, naphthalic anhydride, cinnamic anhydride, furoic anhydride and other aliphatic, aromatic, alicyclic and heterocyclic carboxylic acid anhydrides. In addition, polymeric acids such as polyacrylic acid and polymethacrylic acid and complex acids and mixtures of acids from natural sources such as soybean fatty acids, pectic acid, rosin acids and others, have been found to be operable. It should be noted, however, that the carboxyl content of the acidic "controller" is greater than that of the carboxyl-containing polymer, that is, it is greater than 0.045 to 13.5% by weight.

The metal oxide curing agent for use in the method of this invention may be any of the polyvalent metal oxides including the oxides of zinc, magnesium, cadmium, calcium, titanium, aluminum, barium, strontium, copper, cobalt, tin, iron, lead and others. Specifically, zinc oxide, calcium oxide, cadmium oxide (CdO), magnesium oxide (MgO), dibutyl tin oxide [(C4H9)2SnO], lead oxide (PbO), barium oxide (BaO), cobalt oxide (CO2O3), aluminum oxide (Al2O3), tin oxide (SnO), strontium oxide, and others produce superior results and are preferred. In addition, various polyvalent metal hydroxides (which in reality are hydrated metal oxides which readily give up water either by heat alone or by reaction with a (—COOH) group) such as calcium hydroxide, cadmium hydroxide, zinc hydroxide (which decomposes at 125° C.), barium hydroxide, aluminum hydroxide, and others produce satisfactory salt-formation at curing temperatures of 125 to 400° F. Zinc oxide, because it is readily available and in common use in the rubber industry and produces elastic polymeric metallocarboxylates having excellent properties, is the preferred curing or elasticizing agent.

The rubbery material used in the formation of elasticized polymeric metallo-carboxylates according to this invention is any plastic synthetic polymeric rubbery material comprising predominantly linear carbon chains to which are attached a plurality of free carboxyl (—COOH) groups. One class of rubbery materials of this nature is the plastic polymers of an open-chain aliphatic conjugated diene containing a controlled amount of combined carboxyl (—COOH) groups. These rubbery materials may be made in many different ways as disclosed in my copending applications Serial Nos. 193,521, 193,522 and 193,523 all filed November 1, 1951.

For example, as disclosed in Ser. No. 193,521, they may be made by the interpolymerization in an acidic aqueous medium of a monomeric mixture comprising predominantly (i. e. at least 50% by weight) an open-chain aliphatic conjugated diene and an equal or lesser proportion of an olefinically-unsaturated carboxylic acid.

The open-chain, aliphatic conjugated diene may be any of the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3, and other hydrocarbon homologs of butadiene-1,3; or it may be any of the substituted open-chain, aliphatic conjugated dienes such as 2-chloro butadiene-1,3, 2-cyano butadiene-1,3; or it may be any of the straight chain conjugated pentadienes or the straight- and branch-chain conjugated hexadienes and others. The butadiene-1,3 hydrocarbons and butadiene-1,3 in particular, because of ability to produce stronger and more desirable polymers are much preferred.

The olefinically-unsaturated carboxylic acids which are polymerized with such a diene in the production of carboxyl-containing rubbery polymers are characterized by possessing one or more olefinic carbon-to-carbon double bonds and one or more carboxyl (—COOH) groups, that is, monocarboxy and polycarboxy, monoolefinic and polyolefinic acids including, for example, such widely divergent materials as acrylic acid, the alpha-alkyl acrylic acids, crotonic acid, beta-acryloxy propionic acid, alpha- and beta-vinyl acrylic acids, alpha-beta-isopropylidene propionic acid, sorbic acid, cinnamic acid, maleic acid, oleic acid, undecylenic acid, ricinoleic acid, linoleic acid, linolenic acid and others.

It is preferred to use, as the olefinically unsaturated acid polymerized with the diene, one or more olefinically-unsaturated carboxylic acids containing at least one activated olefinic carbon-to-carbon double bond, that is, an acid containing an olefinic double bond which readily functions in an addition polymerization reaction because of the olefinic double bond being present in the monomer molecule either in the alpha-beta position with respect to a carboxyl group thusly

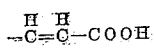

or attached to a terminal methylene grouping thusly $CH_2=C<$. In the alpha-beta unsaturated carboxylic acids the close proximity of the strongly polar carboxyl group to the double-bonded carbon atoms has a strong activating influence rendering the substances containing this structure very readily polymerizable. Likewise, when an olefinic double bond is present attached to a terminal methylene group, the methylenic hydrogen atoms are reactive making the double bonded carbon atoms readily enter into polymerization reactions.

Illustrative alpha-beta unsaturated carboxylic acids within the just-described preferred class include maleic acid, fumaric acid, crotonic acid, alpha-butyl crotonic acid, angelic acid, hydrosorbic acid, cinnamic acid, m-chloro cinnamic acid, p-chloro cinnamic acid, umbellic acid, beta-methyl sorbic acid (isocrotonic or 2-butenoic acid) and other monoolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-, beta-, or gamma-, epsilon-dimethyl sorbic acid, alpha-methyl-gamma-benzal crotonic acid, beta-(2-butenyl) acrylic acid (2,4-heptadiene-oic-1), 2,4-pentadienoic acid, 2,4,6-octatrienoic acid, 2,4,6,8 - decatetrienoic acid, 1 - carboxy-1 - ethyl - 4 - phenyl butadiene - 1,3, 2,6 - dimethyl decatriene-(2,6,8)-oic-10, alpha-beta-isopropylidene propionic acid having the structure

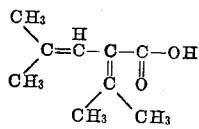

alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, and other monoolefinic polycarboxylic acids; 3-carboxy-pentadiene-(2,4)-oic-1, muconic acid, and other polyolefinic polycarboxylic acids.

Olefinically-unsaturated carboxylic acids containing the $CH_2=C<$ grouping include acrylic acid, alpha-chloro acrylic acid, methacrylic acid, ethacrylic acid, alpha-isopropylidene acrylic acid, alpha-styryl acrylic acid (2-carboxy-4-phenyl butadiene-1,3), beta-vinyl acrylic acid (1-carboxy butadiene-1,3), alpha-vinyl acrylic acid, beta-acryloxy propionic acid, beta-acryloxy acetic acid, and others.

Best results are obtained by interpolymerizing with a diene a monoolefinic monocarboxylic acid having its olefinic double bonds in alpha-beta position to the carboxyl group and also containing a terminal methylene group, such as the acrylic acids including acrylic acid, methacrylic acid, ethacrylic acid, and the like, and other acids of this structure listed above.

As mentioned above, the plastic synthetic rubbery carboxyl-containing polymer of an open chain aliphatic conjugated diene may also be of the type disclosed in my copending application, Serial No. 193,522. Such materials are the product of the reaction of a carboxylating agent or carboxyl-supplying reagent such as maleic acid or anhydride, or acrylic acid or a mercapto-substituted carboxylic acid such as thioglycollic acid, beta-mercapto propionic acid or an anhydride thereof, or a material such as an alkali metal or alkaline-earth mono-salt of a dicarboxylic acid such as mono-sodium oxalate, monosodium succinate, and others, with a plastic polymer of an open-chain aliphatic conjugated diene (preferably a polymer of a butadiene-1,3 hydrocarbon) not containing combined carboxyl groups, preferably but not necessarily in the presence of a peroxygen catalyst. The result of such a reaction is the introduction of carboxyl groups into the diene polymer molecule.

Another type of plastic rubbery carboxyl-containing diene polymeric materials is disclosed in my copending application, Serial No. 193,523. These materials are produced by the reaction with a hydrolyzing agent of a plastic rubbery interpolymer of an open-chain aliphatic conjugated diene (preferably a butadiene-1,3 hydrocarbon) and an olefinically-unsaturated copolymerizable compound containing a group hydrolyzable to a carboxyl (—COOH) group, such as an unsaturated nitrile (acrylonitrile, for example), ester (an alkyl acrylate or alkacrylate, for example) or amide (acrylamide, for example). The result of the hydrolysis reaction is a plastic, rubbery polymer containing combined carboxyl (—COOH) groups.

Another class of plastic rubbery materials, distinct from the carboxyl containing diene polymers, but which may be converted to a strongly-elastic, highly useful polymeric metallo-carboxylates, according to this invention, are the plastic rubbery polymers of an alkyl ester of an acrylic acid containing combined carboxyl groups. Such materials comprise predominantly linear polymer chains and may be produced, for example, as disclosed in copending application Ser. No. 197,524 filed November 24, 1950, by copolymerization in an acidic medium of an alkyl ester of an acrylic acid with an olefinically-unsaturated carboxylic acid of the types described above, or they may be produced, as disclosed in copending application Ser. No. 197,496 filed November 24, 1950, by hydrolysis of a plastic polymer of an alkyl ester of acrylic acid.

Still another class of plastic rubbery synthetic polymeric materials comprising predominantly linear carbon chains to which are attached carboxyl groups, also utilizable in this invention, are the rubbery interpolymers of a predominant amount of an isoolefin such as isobutylene with a subordinate amount of a polymerizable acid chloride such as acrylyl chloride, which interpolymers have been hydrolyzed to convert acid chloride groups to carboxyl groups. The preparation of such materials is more fully described in my copending application Ser. No. 197,497 filed November 24, 1950.

Any other plastic rubbery polymeric material comprising predominantly linear carbon chains to which are attached carboxyl groups, regardless of whether the carboxyl groups are produced by interpolymerization reaction involving a carboxylic acid, by hydrolysis of other groups or by reaction of a rubbery material with a carboxylating agent, or by any other method, may be utilized in the elasticizing reaction of this invention as carried out with a polyvalent metal oxide and controlled by the presence of added carboxylic acid or anhydride. It is important, however, that the plastic, synthetic rubbery material, regardless of how produced, should contain from 0.001 to 0.30 chemical equivalents of combined or polymer-bound free carboxyl groups per 100 parts by weight of rubbery material. The carboxyl-content of the rubber is easily determined by titration of a polymer solution with alcoholic KOH to a phenolphthalein end-point or by complete chemical analysis of the polymer. The plastic, synthetic rubbery materials of the types herein disclosed which contain from 0.001 to 0.30 chemical equivalents by weight of (—COOH) per 100 parts by weight of rubbery material (hereinafter referred to as "equivalents per hundred rubber" and abbreviated ephr.) are predominantly plastic in nature and when elasticized according to the method of this invention produce highly useful elastic rubbery compositions. It is not possible, ordinarily, to obtain a significant degree of elasticization of rubbery materials containing less than 0.001 ephr. of (—COOH). Plastic synthetic rubbery materials containing from 0.01 to 0.20 ephr. of carboxyl are preferred for the production according to this invention of elastic compositions having a good balance of tensile strength, modulus, elongation and hardness while rubbery materials containing from 0.001 to 0.10 ephr. of carboxyl are preferred for the production of elastic compositions having excellent low temperature flexibility and high strength.

In the practice of this invention the rubbery material, the polyvalent metal oxide, and the acidic "controller" are combined into an intimate mixture as by milling or mastication in an internal mixer, and the resulting plastic composition is heated to a temperature of from 125 to 400° F. until elasticization or curing has occurred. The time of heating or curing will vary somewhat depending on the carboxyl-content of the rubbery material, the kind and amount of metal oxide, and on the controller used. Usually, however, a heating or curing cycle of from about five minutes to about two hours will be found sufficient. Further heating, however, does not degrade the elastic product as is observed when a sulfur vulcanizate is subjected to prolonged heating.

The proportion of polyvalent metal oxide required for efficient elasticization of applicant's compositions will vary, of course, depending on the carboxyl content of the rubbery material, on the metal oxide itself, its fineness and state of subdivision, and on its compatibility with the rubbery carboxyl-containing material and on the amount and kind of acidic controller utilized as will be more fully described below. While amounts of metal oxide as little as 1 part by weight per 100 parts of rubber (abbreviated phr.) will cause an observable degree of cure of a carboxyl-containing rubber in the presence of an acidic controller, the amount of polyvalent metal oxide utilized should preferably constitute at least that theoretically required to react with one-half of the carboxyl groups of the polymer and to completely react with the amount of controller present. In any case it is necessary that there be metal oxide present in excess of the amount of controller. Excess of metal oxide over that required for efficient elasticization of the rubbery material is not deleterious and seems to function as a filler only. In general, increases in the metal oxide content show a mass action effect and cause an increase in tensile strength, modulus and other properties. For the latter reasons it is preferable to utilize amounts of metal oxide of twice or more the amount chemically equivalent to the combined carboxyl content of the polymer and of the controller utilized.

The proportion of acidic "controller" to be utilized in conjunction with the polyvalent metal oxide will also vary depending on the carboxyl content of the rubbery material, on the amount and kind of metal oxide utilized and on the controller itself. Generally, however, the amount of controller should be chemically equivalent to at least one-fifth the (—COOH) content of the polymer and preferably one-quarter to one-half or more.

The functioning of the combination of the polyvalent metal oxide and an acidic "controller" is imperfectly understood. One result of the use of the "controller" is to inhibit or retard the curing reaction during shelf storage and during the mixing operations. However, the presence of a "controller" does not necessarily lengthen the curing cycle. Another function is to produce smoother, more uniform elastic compositions that do not wrinkle and curl after removal from the mold. The latter result is believed to be the result of a solubilizing effect on the polyvalent metal oxide making reaction more uniform over the rubbery cross-section. However, the striking differences in the physical properties of elastic compositions produced with a "controller" as compared to elastic compositions prepared without a "controller" would indicate that the controller plays an additional role. For example, though the use of a "controller" results in compositions of generally higher tensile strengths, the outstanding difference is in the concurrent increase in ultimate elongation, and in the compositions which attain very high tensile strengths the increase or reduction in modulus, such that the final composition is "snappier," possesses less permanent set and in general has a better balance of physical properties. The manner in which the "controller" accomplishes these latter results is not fully understood but is believed to be the result of either some rearrangement of electrostatic forces between the polymer chains, some other modification of secondary intercrystalline forces, or to be the result of an inter-chain spacing, chain realignment or lubrication.

The invention will now be more fully described with reference to certain specific examples which shall describe in detail the practice of the invention utilizing various carboxyl-containing rubbery materials, various metallic oxide curing agents, and various acidic controllers.

EXAMPLE 1

A rubbery interpolymer consisting of the interpolymerization product of a monomeric mixture consisting of 94 parts by weight of butadiene-1,3 and 6 parts by weight of sorbic acid is prepared by polymerization at 40° C. in an aqueous emulsion having the following composition:

| Material | Parts/Wt. |
| --- | --- |
| Monomers (to total) | 100.0 |
| Water | 200.0 |
| Dodecylamine (90% neutralized with HCl) | 5.0 |
| t-dodecyl mercaptan | 0.4 |
| Potassium persulfate | 0.2 |
| Aluminum chloride | 0.2 |

The resultant polymer latex is short-stopped at 74% conversion with 0.2% by weight of hydroquinone and stabilized with 1.5% by weight of phenyl-beta-naphthylamine on the polymer solids and then coagulated under acidic conditions to yield an interpolymer analyzing 0.04 ephr. of carboxyl (—COOH). Zinc oxide, 10 phr. is incorporated by milling into one sample of the polymer and into another sample there is similarly incorporated 10 phr. of zinc oxide and 6 phr. of sebacic acid. Both samples are then tested in the "Mooney Scorch Test" carried out at 212° F. utilizing a Mooney viscosimeter with the small (1.200") rotor. The test reveals that the sample containing only the zinc oxide suffers an increase in Mooney viscosity of 20 in 2.5 minutes while the composition containing sebacic acid showed zero rise in Mooney in 30 minutes at 212° F. Samples of both compositions were also heated for 40 minutes at 326° F. to bring about elasticization or curing. The tensile strength of the cured composition containing sebacic acid is more than twice that of the composition not containing the acid; its modulus was reduced and its elongation almost doubled as compared to the cured composition prepared without sebacic acid. The low temperature flexibility of both compositions, as determined by the Gehman Low Temperature Flexibility test, is excellent, the Gehman $T_5$ of both compositions being −65° C. and the Gehman Freeze Point (FP) being −69° C. The latter Gehman values very closely approximate those of sulfur vulcanizates of polybutadiene.

Incorporation in a similar manner of amounts of other carboxylic acids and anhydrides substantially equivalent to the 6.0 phr. of sebacic acid in the copolymer of Example 1 and subjecting the resulting compositions to the Mooney Scorch test at 212° F. reveals the following results:

| Zinc Oxide | Controller, phr. | Ms Temp., °F. | Ms Rise |
|---|---|---|---|
| 11 phr | None | 300 | Very rapid cure. |
| Do | Palmitic acid, 17.1 | 300 | 0 in 30 minutes. |
| Do | Phthalic anhy., 4.95 | 300 | 30 in 11.5 minutes |
| Do | Citric acid, 4.95 | 300 | 0 in 30 minutes. |

Similarly, a copolymer prepared by the polymerization in the acidic aqueous medium of Example 1 of a mixture of 94.4% by weight of butadiene-1,3 and 5.6% of sorbic acid containing 0.04 ephr. of COOH and having an original Mooney viscosity of 56 using the small rotor after four minutes at 212° F., is admixed with 9 phr. of zinc oxide and varying amounts of still other carboxylic acids and anhydrides. Mooney scorch data on the resulting compositions is as follows:

| Controller, phr. | Ms Temp., °F. | Time to Ms Rise of 30 |
|---|---|---|
| None | 212 | 3 minutes. |
| Phthalic anhydride, 3.6 | 212 | No cure in 30 minutes. |
| Do | 300 | Do. |
| Furyl Acrylic Acid, 4.9 | 212 | Do. |
| Do | 300 | Do. |
| Terephthalic acid, 3.6 | 212 | Do. |
| Acid "A," 7.5a | 212 | Do. |
| Acid "B," 4.9b | 212 | Do. |
| Stearic acid, 12.3 | 212 | Do. |
| Do | 300 | Do. |
| Soybean fat acids, 12.8 | 212 | Do. |
| Pectic Acid, 8.0 | 212 | 10 minutes. |
| Dilinoleic Acid, 13.5 | 212 | 21 minutes. |
| Polyacrylic acid, 3.1 | 212 | 14 minutes. |
| Polymethacrylic acid, 3.7 | 212 | 8.5 minutes. |
| Acid "C," 5.5c | 212 | 14.5 minutes. |
| Oxidized lignin, 29.4 | 212 | 8.0 minutes. |
| Acid "D," 3.1d | 212 | 8.5 minutes. | a 2,2'-bis(4-carboxymethyl-phenyl)propane.
b 3,7-dithianonanedioic acid.
c 4,8-dithia-6-oxahendecadioic acid.
d N-methyl, N,N-di(carboxyethyl)amine.

EXAMPLE 2

A tripolymer containing 0.1102 ephr. of (—COOH), prepared by the polymerization to 90% conversion in a dodecylamine hydrochloride emulsified recipe similar to that of Example 1 of a monomeric mixture consisting of 55% by weight of butadiene-1,3, 35% acrylonitrile and 10% methacrylic acid, and having an original small rotor Mooney viscosity (4 min. @ 212° F.) of 91, is compounded in separate samples (1) with 11 phr. of zinc oxide and (2) with 14 phr. of zinc oxide and 5 phr. of phthalic anhydride and both cured for 80 minutes at 326° F. Composition (1) has a tensile strength of 7040 lbs./sq. in., a modulus at 300% elongation of 4160 lbs./sq. in., and an ultimate elongation of 390% and composition (2) has a tensile strength of 8560 lbs./sq. in., a modulus at 300% elongation of 3800 lbs./sq. in. and an ultimate elongation of 435%. Both compositions were "pure gum" or unreinforced compositions.

The metallo-carboxylate prepared from the 55/35/10 tripolymer of Example 2 when cured according to the method of this invention has the additional highly desirable properties of great resistance to ozone and good retention of stress-strain properties at elevated temperatures. For example, when compounded with 10 phr. of zinc stearate, 2.5 phr. of diphenyl guanidine, 1.5 phr. of sulfur, and 30 phr. of channel black and given an optimum cure of 40 minutes at 300° F., the time for initial cracking following 20% stretch (and then rested for 24 hrs.) while being subjected to .24 parts per million of ozone at 100° F. is 21.1 hours while a polymeric metallo-carboxylate prepared from the tripolymer using 10 phr. of zinc oxide and 4 phr. of phthalic anhydride by heating for 80 minutes at 300° F. shows initial cracking at 142 hours. The sulfur vulcanizate of the tripolymer has an ultimate elongation at room temperature of 430%, at 115° F. of 320%, and at 212° F. of 280%. The polymeric metallo-carboxylate, on the other hand, has an ultimate elongation at room temperature of 370%, at 115° F. of 400%, and at 212° F. of 560%. Thus the polymeric metallo-carboxylate has about seven times better ozone resistance than the sulfur vulcanizate and in addition shows better retention of stress-strain properties at elevated temperatures.

In a similar fashion a tripolymer containing 0.092 ephr. of (—COOH), made by the method of Example 1 from a monomeric mixture consisting of 67% by weight of butadiene-1,3, 24.4% acrylonitrile and 8.6% methacrylic acid is compounded in separate samples with (1) 10 phr. of zinc oxide and (2) with 12 phr. of zinc oxide and 4 phr. of phthalic anhydride and both cured for 40 minutes at 326° F. Composition (1) exhibits in the "pure gum" or unreinforced condition 7380 lbs./sq. in. tensile strength, a modulus at 300% elongation of 1760 lbs./sq. in., and an ultimate elongation of 485%. By comparison, composition (2) exhibits a tensile strength of 10,680 lbs./sq. in., a modulus of 1960 lbs./sq. in., and an elongation of 540%. In both cases, the incorporation of small amounts of phthalic anhydride improves the tensile strength and elongation. In the case of the 55/35/10 tripolymer the modulus was decreased by the incorporation of the controller while in the case of the 67/24.4/8.6 tripolymer the low modulus of the plain zinc oxide composition was improved by the incorporation of phthalic anhydride to yield a composition having a better balance of elastomeric properties.

EXAMPLE 3

A rubbery polymer made by the method of Example 1 from a monomeric mixture consisting of 94.4 parts butadiene-1,3 and 5.6 parts of sorbic acid containing 0.039 ephr. of (COOH) and having a small rotor Mooney viscosity after 4 minutes at 212° F. of 56 (at 84.5% conversion) is utilized in this example. To one portion (A) of the copolymer there are added 9 phr. of zinc oxide and 10 phr. of stearic acid; to another portion (B) of the copolymer there are added 11 phr. of zinc oxide and 19 phr. of zinc stearate; to still another portion (C) there is added 14 phr. of zinc oxide and 5 phr. of phthalic anhydride; to yet another portion (D) there is added 11 phr. of zinc oxide and 7 phr. of zinc phthalate. The above compositions are heated in a press mold for 20 minutes at 326° F. to effect cure or elasticization. In summary, the physical properties of the elastic compositions obtained are:

| Sample | Tensile, lbs./sq. in. | 300% Modulus, lbs./sq. in. | Elongation, percent |
|---|---|---|---|
| A | 3,400 | 750 | 595 |
| B | 2,700 | 1,020 | 595 |
| C | 2,190 | 1,480 | 415 |
| D | 1,810 | 1,140 | 435 |

The results show that in each case the combination of zinc oxide and either stearic acid or phthalic anhydride is superior to the combination of zinc oxide with corresponding amounts of the zinc stearate or zinc phthalate. In each case where an acidic controller was present (Samples A and C) the cured or elastic compositions were smooth in appearance while Samples B and D were wrinkled and rough.

EXAMPLE 4

A tripolymer containing 0.0987 ephr. of (—COOH), prepared by the polymerization in a dodecylamine hydrochloride emulsified recipe similar to that of Example 1 of a monomeric mixture consisting of 67 parts by weight of butadiene-1,3, 24.4 parts by weight of acrylonitrile, and 8.6 parts by weight of methacrylic acid, is utilized in this example. The tripolymer is admixed with 12 phr. of zinc oxide (or 0.2961 ephr.) and 4.9 phr. of succinic anhydride (or 0.0980 ephr.). The resulting composition shows no evidence of cure after shelf storage for 2 months at room temperature. When the composition is subjected to press molding for varying times at 33,000 lbs./sq. in., at 326° F. smooth, wrinkle-free elastic compositions are obtained having the following properties:

| Length of Heating | 300% Modulus, lbs./sq. in. | Tensile, lbs./sq. in. | Elongation, percent |
|---|---|---|---|
| 5 minutes at 326° F | 380 | 1,290 | 645 |
| 10 minutes at 326° F | 510 | 2,970 | 635 |
| 20 minutes at 326° F | 1,040 | 6,140 | 620 |
| 40 minutes at 326° F | 1,040 | 8,520 | 635 |

When another portion of the same tripolymer is admixed with only 8 phr. of zinc oxide and heated for 5 minutes at 326° F. a composition is produced having a modulus (300%) of 750 lbs./sq. in., a tensile strength of 6,000 lbs./sq. in. and an elongation of only 565%. When the latter composition is heated further at 326° F. only the modulus is increased. Thus succinic anhydride not only eliminates scorching during milling and shelf storage but also yields a composition which does not exhibit "flat" curing characteristics. True control of the salt-formation reaction is shown by the progressive improvement in modulus and tensile strength with continued heating.

EXAMPLE 5

Excellent control of the salt-formation reaction may also be achieved by the use of a mixture of acid anhydrides. A tripolymer made from the 67/24.4/8.6 monomeric mixture described in Example 2, but containing 0.0956 ephr. of (—COOH), is mill-mixed with 18.0 phr. of zinc oxide (0.444 ephr.), 4.9 phr. of maleic anhydride (0.10 ephr.), and 7.3 phr. of phthalic anhydride (0.0986 ephr.). The resultant composition shows no sign of scorch or cure after 2 months of storage at room temperature. When the composition is heated with various curing cycles at 326° F., smooth, wrinkle-free compositions are produced having the following properties:

| Length of Heating | 300% Modulus, lbs./sq. in. | Tensile, lbs./sq. in. | Elongation, percent |
|---|---|---|---|
| 5 minutes at 326° F | 730 | 2,650 | 650 |
| 10 minutes at 326° F | 1,460 | 5,500 | 560 |
| 20 minutes at 326° F | 1,840 | 6,580 | 560 |
| 40 minutes at 326° F | 2,320 | 7,040 | 525 |

Thus the mixture of maleic and phthalic anhydride prevents scorch during milling and shelf-storage and yields a composition the properties of which can be adjusted to some extent according to the length of the curing cycle.

EXAMPLE 6

Metallic oxides, other than zinc oxide, may be utilized in conjunction with the acidic controllers of this invention to produce strong, elastic pure gum compositions. A tripolymer containing 0.099 ephr. of (—COOH), produced by the polymerization to 73% conversion in an acidic aqueous emulsion similar to that of Example 1 of a monomeric mixture consisting of 67 parts by weight of butadiene-1,3, 24.4 parts by weight of acrylonitrile and 8.6 parts by weight of methacrylic acid is admixed with various metallic oxides and phthalic anhydride and press molded for 40 minutes at 300° F. to produce compositions having the following properties:

| Material, phr. | Sample 1 | Sample 2 | Sample 3 | Sample 4 | Sample 5 | Sample 6 |
|---|---|---|---|---|---|---|
| Zinc oxide, phr | 10 | 13 | | | | 5.0 |
| Zinc oxide, ephr | 0.247 | 0.32 | | | | 0.124 |
| Calcium oxide, phr | | | 7.0 | 3.0 | | |
| Calcium oxide, ephr | | | 0.25 | 0.107 | | |
| Cadmium oxide, phr | | | | | 15.0 | |
| Cadmium oxide, ephr | | | | | 0.234 | |
| Magnesium oxide, phr | | | | | | 4.0 |
| Magnesium oxide, ephr | | | | | | 0.200 |
| Phthalic Anhydride, phr | 3.7 | 4.0 | 3.7 | 1.85 | 3.7 | 4.0 |
| Phthalic Anhydride, ephr | 0.05 | 0.054 | 0.05 | 0.025 | 0.05 | 0.054 |
| 300% Modulus, lbs./sq. in | 1,200 | 1,220 | 3,280 | 560 | 2,500 | 2,180 |
| Tensile Strength, lbs./sq. in | 8,900 | 9,600 | 8,100 | 4,100 | 7,600 | 8,200 |
| Elongation, percent | 610 | 620 | 500 | 660 | 525 | 530 |

It is seen by a comparison of samples 1 and 3 that nearly equivalent amounts of calcium oxide seems to favor higher moduli than zinc oxide. A comparison of samples 1 and 5 will reveal that cadmium oxide also seems to favor higher moduli as compared to zinc oxide. Comparison of samples 2 and 6 reveals that replacement of only a portion of the zinc oxide with magnesium oxide seems to favor higher moduli indicating that magnesium oxide used alone will yield higher moduli compositions than zinc oxide.

In a similar fashion the substitution for the 10 phr. of zinc oxide and 3.7 phr. of phthalic anhydride of the composition of Sample 1 shown in the table of this example of respectively, 8.5 phr. or calcium hydroxide and 10 phr. of stearic acid; 17 phr. of cadmium hydroxide and 10 phr. of stearic acid, 6.75 phr. of magnesium hydroxide and 10 phr. of stearic acid, and 25.5 phr. of dibutyl tin oxide and 10 phr. of stearic acid, and the resulting compositions heated for 40 minutes at 326° F., produces strong elastic compositions having in each case a tensile strength in excess of 7,000 lbs./sq. in., moduli at 300% elongation ranging from 1500 to 4,000 lbs./sq. in., and elongations ranging from 400 to 650%.

EXAMPLE 7

Latices are prepared by the polymerization of the monomeric materials in a recipe having the following composition:

| Material | Parts/Wt. |
|---|---|
| Monomers (to total) | 100.0 |
| S. F. Flakes | 5.0 |
| K$_2$S$_2$O$_8$ | 0.3 |
| Modifier (variable 0.1 to 0.35 part) | |
| Emulsion Stabilizer [1] | 1.0 |
| Water | 200.0 |

[1] Sodium salts of polymerized alkaryl sulfonic acids known as "Daxad 11P."

Polymerization of a monomeric mixture consisting of 90 parts butadiene-1,3 and 10 parts of ethyl acrylate in the presence of 0.1 part per 100 parts of monomers of t-dodecyl mercaptan at 50° C. yields an excellent stable latex of the butadiene ethyl acrylate copolymer. Similarly, a mixture of 90 parts of butadiene-1,3 and 10 parts of methyl methacrylate in the presence of 0.25 part of t-dodecyl mercaptan at 50° C. yields a stable butadiene methyl methacrylate copolymer latex. A mixture of 90 parts by weight of butadiene-1,3 and 10 parts of acrylonitrile polymerized at 50° C. in the presence of 0.35 part of t-dodecyl mercaptan yields a stable butadiene acrylonitrile copolymer latex which analyzes as containing 19.4% combined acrylonitrile. The three described latices are subjected to hydrolysis in a closed vessel by first warming them to 40 to 50° C. and adding 2N sodium hydroxide solution slowly while stirring. In the case of the butadiene ethyl acrylate latex, a total of 0.44 mole of NaOH per 100 grams of polymer is added and the mixture agitated at 110° C. for 6 hours. In the case of the butadiene methyl methacrylate copolymer latex, 0.43 mole of NaOH per 100 grams of polymer are added and the resulting alkali-latex mixture heated to 170 to 175° C. for 6 hours. The butadiene acrylonitrile copolymer latex is similarly treated with 0.2 mole of NaOH/100 grams of polymer and heated for six hours at 197 to 200° C. After hydrolysis, the latices at 45 to 55° C. are slowly acidified with 3.7% hydrochloric acid to a pH between 1.0 and 1.5. Such treatment results in virtually complete coagulation of the latices. The coagulated polymers are twice heated to 60 to 70° C. in water at a pH of 1.0 to 1.5 and then warmed to 50 to 60° C. in two or more changes of fresh water until only traces of chloride can be detected in the wash water. The treated polymers are then dried in a circulating air oven at 60° C.

A solution of each of the copolymers, 1 gram of polymer in 100 ml. of a 95/5 mixture of chlorobenzene and ethanol, is titrated with standardized alcoholic KOH to a phenolphthalein end point. The latter test reveals that the hydrolyzed butadiene ethyl acrylate polymer contains 0.11 ephr. of (—COOH), the hydrolyzed butadiene methyl methacrylate polymer contains 0.12 ephr. of (—COOH), and hydrolyzed butadiene acrylonitrile polymer contains 0.08 ephr. of (—COOH). When each hydrolyzed polymer is compounded with 12 phr. of zinc oxide and 3 phr. of phthalic anhydride and heated for 40 minutes at 300° F. the resulting compositions are converted to the strong elastic condition. The hydrolyzed butadiene methyl methacrylate in particular produces a composition having a tensile of 3800 lbs./sq. in., a modulus at 300% elongation of 2600 lbs./sq. in., and an ultimate elongation of 355% (in pure gum or unreinforced condition).

EXAMPLE 8

As disclosed elsewhere herein, rubbery carboxyl-containing materials may be made by the reaction of carboxylating agents with rubbery diene polymeric materials. For example, polybutadiene-1,3 synthetic rubber is prepared by polymerization in aqueous emulsion so as to produce a gel-free or completely soluble polymer. The polybutadiene latex is short-stopped with 0.1% by weight of hydroquinone and stabilized against oxidation by the addition of 1.5% by weight of phenyl-beta-naphthylamine based on the rubber. Thirty grams of the polybutadiene rubber are placed in a glass bottle and 500 cc. of benzene added thereto. The bottle is then flushed with nitrogen, capped and the bottle warmed to 50° C. with agitation to dissolve the rubber. To the resulting polymer solution there are added 1.5 grams of benzoyl peroxide and 9.2 grams of thioglycollic acid

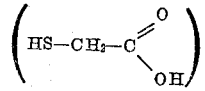

and the bottle again flushed with nitrogen and capped. The contents of the bottle are again warmed to 50° C. and agitated at that temperature for 24 hours. The polymer adduct is recovered by evaporation of the benzene, washing the solid polymer twice with ethyl alcohol containing 3% by weight of phenyl-beta-naphthylamine dissolved therein, and drying at 55° C. under vacuum. The polybutadiene thioglycollic acid adduct is found to contain 0.07 ephr. of (—COOH) and to contain 60% gel. Zinc oxide 10 phr. and phthalic anhydride 4 phr. are added to a portion of the polymer and the resulting composition heated for 40 minutes at 300° F. to obtain a strong elastic composition having 1700 lbs./sq. in. tensile strength, 235% elongation and a Gehman T$_5$ of —55° C. and a FP of —62° C. By contrast the polybutadiene adduct when similarly cured with 5.7 phr. zinc oxide and no phthalic anhydride has a tensile strength of only 1120 lbs./sq. in. The untreated polybutadiene synthetic rubber when similarly cured exhibits a tensile strength of only 90 lbs./sq. in., an elongation of 500%, a Gehman T$_5$ of —61° C. and a Gehman FP of —72° C. Polybutadiene adducts of higher carboxyl contents when elasticized with a polyvalent metallic oxide are very strong elastic materials.

In a similar fashion 60 grams of the polybutadiene synthetic rubber of Example 8 are dissolved in 600 cc. of benzene, 2.9 grams of benzoyl peroxide and 19.08 grams of beta-mercapto propionic acid added thereto and the reaction vessel swept out with nitrogen. The resulting mixture is agitated at 50° C. for 24 hours to yield a product containing 0.068 ephr. of (—COOH). The addition of zinc oxide, 12 phr. and phthalic anhydride, 4 phr., followed by heating for 40 minutes at 300° F. converts the polybutadiene beta-mercapto propionic acid adduct to a strong elastic composition.

EXAMPLE 9

To 30 grams of the polybutadiene synthetic rubber described in Example 8 dissolved in 500 cc. of benzene, there are added 12.1 grams of benzoyl peroxide and 9.8 grams of maleic anhydride. The vessel containing the resulting solution is swept out with nitrogen and sealed. Agitation of the contents at 50° C. for 3 days produces a product which when admixed with 10 phr. of zinc oxide and 4 phr. of phthalic anhydride and heated 80 minutes at 300° F. evidences a tensile strength of 2140 lbs./sq. in. (a pure gum composition).

EXAMPLE 10

60 grams of a copolymer produced by the emulsion polymerization of a mixture consisting of 55% butadiene and 45% acrylonitrile (known commercially as "Hycar OR-15") are dissolved in 600 cc. of benzene, 2.9 grams of benzoyl peroxide and 19.08 grams of beta-mercapto propionic acid added thereto, and the reaction vessel swept out with nitrogen and sealed. The resulting solution is warmed to 50° C. and agitated at that temperature for 24 hours. The product is found to contain 0.119 ephr. of (—COOH). Upon being admixed with 12 phr. of zinc oxide and 4 phr. of phthalic anhydride and heated 80 minutes at 300° F., a smooth, elastic composition is produced having a tensile strength of 2940 lbs./sq. in., a 300% modulus of 890 lbs./sq. in., and an elongation of 610%. When the untreated butadiene acrylonitrile copolymer is admixed with 8 phr. of zinc oxide and similarly heated, the resulting composition has a tensile strength of only 1160 lbs./sq. in. at 1620% elongation (no break) showing that it has not been elasticized by such treatment.

EXAMPLE 11

60 grams of the butadiene acrylonitrile copolymer described in Example 10 are treated in 600 cc. of benzene with 6 grams of benzoyl peroxide and 19.6 grams of maleic anhydride and agitated 8 days at 50° C. to produce a product containing 0.028 ephr. of (—COOH). The raw adduct has a tensile strength of 360 lbs./sq. in., a 300% modulus of 300 lbs./sq. in. and an ultimate elongation of 350%. When, however, the adduct is admixed with 10 phr. of zinc oxide and 4 phr. of phthalic anhydride and heated in a mold for 80 minutes at 300° F. the resulting elastic composition has a tensile strength of 3310 lbs./sq. in., a 300% modulus of 400 lbs./sq. in., and an ultimate elongation of 900%.

EXAMPLE 12

The polymer-acid adducts prepared in Examples 8 to 11 may also be prepared by masticating a mixture of a polymerized butadiene-1,3 hydrocarbon rubber, a mercapto-substituted carboxylic acid or maleic anhydride, and an organic peroxide. For example, the butadiene acrylonitrile copolymer utilized in Example 10 is placed on a cool tight rubber mill and a smooth band formed. To the smooth band of rubber there are added 11.7 phr. of beta-mercapto propionic acid and 4.84 phr. of benzoyl peroxide. Milling is continued until a smooth homogeneous composition is obtained, a total of from 15 to 30 minutes being consumed in the milling operation. The temperatures obtaining during the milling operation range from 150 to 200° F. The resulting composition is then admixed with 10 phr. of zinc oxide and 4 phr. of phthalic anhydride and press-molded for 40 minutes at 326° F. The resulting elastic composition exhibits a tensile strength of 2400 lbs./sq. in., a modulus of 1710 lbs./sq. in. and an elongation of 395%. By comparison the untreated polymer when admixed with 8 phr. of zinc oxide and similarly cured exhibits a tensile strength of only 910 lbs./sq. in. at an elongation of 1100% (no break).

EXAMPLE 13

A standard butadiene styrene copolymer prepared by polymerization in aqueous emulsion of a mixture consisting of 71.5 parts by weight of butadiene-1,3 and 28.5 parts by weight of styrene and known commercially as "GRS-X506" is treated on a rubber mill as in Example 12 with 4.84 phr. of benzoyl peroxide and 10 phr. of thioglycollic acid. The resultant plastic composition is admixed with 10 phr. of zinc oxide and 4 phr. of phthalic anhydride and press-molded for 40 minutes at 326° F. The resultant elastic composition exhibits a tensile strength of 2600 lbs./sq. in., a modulus of 1400 lbs./sq. in., and an elongation of 585%. By comparison, the untreated copolymer when similarly mixed with 10 phr. of zinc oxide and 4 phr. of phthalic anhydride and similarly cured exhibits a tensile strength of less than 10 lbs./sq. in. at 85% elongation, which is not substantially greater than that possessed by the original uncured butadiene styrene copolymer.

EXAMPLE 14

The foregoing examples have been concerned with the curing or elasticization of rubbery diene-type polymers. The combination of a polyvalent metal oxide and an acidic substance selected from the class of carboxylic acids and anhydrides produces polymeric metallo-carboxylates from rubbery carboxyl-containing polymers of the alkyl acrylates which are far superior to those elasticized with the polyvalent metallic oxide alone. For example, a rubbery tripolymer of ethyl acrylate and a mixture of acrylic and methacrylic acids is prepared by the polymerization at 50° C. of the monomers contained in the following acidic aqueous medium:

| Material | Parts/Wt. |
| --- | --- |
| Ethyl Acrylate | 96.00 |
| Acrylic Acid | 2.00 |
| Methacrylic Acid | 2.00 |
| Emulsifier #1 | 2.00 |
| Emulsifier #2 | 1.00 |
| Sulfuric Acid | 0.10 |
| Potassium Persulfate | 0.20 |
| Water | 150.00 |

The latex resulting from carrying the above polymerization to 87.5% conversion is stable and contains a polymer which analyzes to contain 0.047 ephr. of combined carboxyl (—COOH). When this polymer is mixed first (A) with 4.07 phr. of zinc oxide alone and then (B) with 5.08 phr. of zinc oxide and 7.1 phr. of stearic acid and the two samples heated in a press mold for 40 minutes at 260° F. polymeric metallo-carboxylates are obtained having the following properties:

| | Sample (A) | Sample (B) |
| --- | --- | --- |
| Tensile Strength lbs./sq. in. | 1,280 | 2,640 |
| Modulus at 300% Elongation lbs./sq. in. | 240 | 640 |
| Elongation (Ultimate) percent | 755 | 700 |

It is obvious that the presence of the stearic acid caused the ultimate tensile strength and modulus to be more than doubled, without sacrifice in the elongation.

Similarly, other tripolymers of ethyl acrylate, acrylic acid, and methacrylic acid prepared in the medium of Example 14 but made, respectively, from mixtures containing 94% ethyl acrylate, 3% acrylic acid, and 3% methacrylic acid and 89% ethyl acrylate, 5.5% acrylic acid, and 5.5% methacrylic acid so as to contain, respectively, 0.078 ephr. and 0.1250 ephr. of carboxyl (—COOH), when elasticized with zinc oxide alone and with a combination of zinc oxide and stearic acid, show the following properties:

|  | Samples | | | |
| --- | --- | --- | --- | --- |
|  | C | D | E | F |
| ephr. (—COOH) | 0.078 | 0.078 | 0.125 | 0.125 |
| Zinc Oxide, phr | 6.34 | 7.94 | 10.20 | 10.60 |
| Stearic Acid, phr | 0.00 | 11.10 | 0.00 | 3.00 |
| Tensile Strength (lbs./sq. in.) | 1,390 | 2,830 | 2,480 | 4,000 |
| Modulus at 300% Elongation (lbs./sq. in.) | 530 | 1,420 | 2,250 | 3,850 |
| Elongation, percent | 595 | 460 | 365 | 340 |

Thus in this example three rubbery ethyl acrylate polymers containing various levels of carboxyl have been shown to respond with superior results to the use in the curing or elasticization step of a combination of a metal oxide with an acidic controller substance such as stearic acid.

EXAMPLE 15

Still another rubbery carboxyl-containing material which is efficiently converted to elastic polymeric metallo-carboxylates by the method of this invention is a rubbery polymer of isobutylene and acrylyl chloride which has been hydrolyzed to convert the acid chloride groups to carboxyl (—COOH) groups. Such a polymer is made by dissolving a mixture of 1.0 mole (56 parts/wt.) of isobutylene and 0.2 mole (18.0 parts by wt.) of acrylyl chloride in ethyl chloride and slowly adding the resultant solution to a catalyst solution consisting of 1.25 gms. of anhydrous aluminum chloride dissolved in 250 gms. of anhydrous ethyl chloride. The reaction is carried out in 10 minutes or less at a temperature of —100° C. or lower. The polymer is separated from the liquid components of the reaction medium and quenched in a water bath at a temperature of about 0 to 10° C. The crumb-like polymer is then separated from the aqueous phase by screening and then washed with clear water until the wash water is free chloride ion. The washed coagulum is then placed in a Brabender internal mixer and masticated at a temperature of 70 to 75° C. under vacuum until a dry slightly sticky mass is obtained. The product is found to contain .04 ephr. of (—COOH) or 2.8% acid (as acrylic acid) and to possess a molecular weight of 250,000. When the rubbery, still plastic polymer is mixed with 5.0 phr. of zinc oxide and 18.5 phr. of stearic acid and heated 40 minutes at 280° F. an elastic polymeric metallo-carboxylate is obtained having a tensile strength in excess of 3000 lbs./sq. in. By contrast, a polyisobutylene when similarly cured exhibits no sign of elasticization.

EXAMPLE 16

Several tripolymers produced by polymerization in acidic aqueous emulsion (as in Example 1) of mixtures of butadiene-1,3, acrylonitrile, and methacrylic acid are utilized in compositions containing various amounts of zinc oxide and a standard amount of phthalic anhydric in order to demonstrate the effect of zinc oxide level. The compositions are heated for 80 minutes at 300° F. to produce elastic pure gum compositions having the following properties:

| Polymer: | | | |
| --- | --- | --- | --- |
| Monomer Ratio (diene-nitrile-acid) | 86.1/5.3/9.6 | 67/24.4/8.6 | 67/24.4/8.6 |
| Percent Conversion | 72 | 73 | 71 |
| MS-4', 212° F | 41 | 21 | 39 |
| ephr., (—COOH) | 0.104 | 0.099 | 0.100 |
| Zinc Oxide—Twice Theory or More: | | | |
| Zinc oxide, phr | 10.0 | 13.0 | 14.0 |
| Zinc oxide, ephr | 0.25 | 0.32 | 0.35 |
| Phthalic Anhydride, phr | 4.0 | 4.0 | 4.0 |
| Phthalic Anhydride, ephr | 0.05 | 0.05 | 0.05 |
| 300% Modulus, lbs./sq. in | 1,440 | 1,230 | 1,580 |
| Tensile Strength, lbs./sq. in | 4,290 | 9,600 | 9,340 |
| Elongation, Percent | 490 | 620 | 610 |
| Zinc Oxide—One and One-half Theory: | | | |
| Zinc oxide, phr | 8.0 | 8.0 | 8.0 |
| Zinc oxide, ephr | 0.20 | 0.20 | 0.20 |
| Phthalic Anhydride, ephr | 0.05 | 0.05 | 0.05 |
| 300% Modulus | 1,190 | 1,220 | 1,460 |
| Tensile | 2,660 | 8,980 | 8,400 |
| Elongation | 480 | 595 | 585 |
| Zinc Oxide—Theory: | | | |
| Zinc oxide, phr | 6.0 | 6.0 | 6.0 |
| Zinc Oxide, ephr | 0.15 | 0.15 | 0.15 |
| Phthalic Anhydride, ephr | 0.05 | 0.05 | 0.05 |
| 300% Modulus | 890 | 490 | 500 |
| Tensile | 1,310 | 4,090 | 4,000 |
| Elongation | 400 | 700 | 700 |
| Zinc Oxide—One-half Theory: | | | |
| Zinc oxide, phr | 4.0 | 4.0 | 4 |
| Zinc oxide, ephr | 0.10 | 0.10 | 0.10 |
| Phthalic Anhydride, ephr | 0.05 | 0.05 | 0.05 |
| 300% Modulus | 370 | 200 | 300 |
| Tensile | 780 | 890 | 990 |
| Elongation | 655 | 980 | 840 |

It will be noted that significant elasticization is obtained when amounts of zinc oxide chemically equivalent to one-half the carboxyl content of the polymer plus the carboxyl content of the controller utilized (the tensile strength of the uncured polymers range from 20 to 100 lbs./sq. in. at elongations of about 1620% with no break) and the properties of the elastic compositions progressively improve as the zinc oxide level is increased to twice theory or more.

Although the invention has been illustrated by the foregoing examples, it is understood that the invention is not limited thereto and that numerous variations and modifications which will be obvious to those skilled in the art are within the spirit and scope of the invention as defined by the appended claims.

I claim:
1. The process which comprises preparing a mixture of (1) a plastic synthetic rubbery polymeric material comprising predominantly linear carbon chains to which are attached from 0.001 to 0.30 chemical equivalents by weight of combined —COOH per 100 parts by weight of polymeric material, said synthetic rubbery polymeric material being selected from the class consisting of polymers of an open-chain aliphatic conjugated diene, polymers of alkyl acrylates and polymers of isoolefins, (2) a polyvalent metal oxide and (3) an acidic substance selected from the class consisting of carboxylic acids and carboxylic acid anhydrides, said metal oxide and said acidic substance being present in amounts, respectively, equivalent to at least one-half and at least one-fifth of said combined —COOH of said polymeric material, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic polymeric material.

2. The process which comprises preparing a mixture of (1) a plastic rubbery polymer of an open-chain aliphatic conjugated diene containing from 0.001 to 0.30 chemical equivalents by weight of combined —COOH per 100 parts by weight of polymer, (2) a polyvalent metal oxide and (3) an acidic substance selected from the class consisting of carboxylic acids and carboxylic acid anhydrides, said metal oxide and said acidic substance being present in amounts, respectively, equivalent to at least one-half and one-fourth of said combined —COOH of said rubbery polymer, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic polymer.

3. The process which comprises preparing a mixture of (1) a plastic, synthetic rubbery material containing from 0.001 to 0.30 chemical equivalents by weight of combined —COOH per 100 parts by weight of rubbery material by the polymerization in an acidic aqueous medium of a monomeric mixture comprising an open-chain aliphatic conjugated diene and an olefinically-unsaturated carboxylic acid, (2) a polyvalent metal oxide and (3) an acidic substance selected from the class consisting of carboxylic acids and carboxylic acid anhydrides, said metal oxide and said acidic substance being present in amounts, respectively, equivalent chemically to at least one-half and at least one-fourth said combined —COOH of said rubbery material, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic polymer.

4. The process which comprises preparing a mixture of (1) a plastic synthetic rubbery polymer of a butadiene-1,3 hydrocarbon containing from 0.001 to 0.30 chemical equivalents by weight of combined carboxyl per 100 parts by weight of rubbery polymer, (2) a polyvalent metal oxide and (3) an acidic substance selected from the class consisting of carboxylic acids and carboxylic acid anhydrides, said metal oxide and said acidic substance being present in amounts, respectively, equivalent chemically to at least one-half and at least one-fourth said combined carboxyl of said polymer, and then heating the resulting plastic composition at a temperature of from 125 to 400° F. until said plastic composition has been converted to an elastic polymeric metallo-carboxylate by salt formation between the metallic cation of said metal oxide and the combined carboxyl groups of the plastic polymer.

5. The process which comprises preparing a mixture of (1) a plastic synthetic rubbery material containing from 0.001 to 0.30 chemical equivalents by weight of combined —COOH per 100 parts by weight of rubbery material by reacting a plastic polymer of butadiene-1,3 hydrocarbon with a carboxylation agent, (2) a polyvalent metal oxide and (3) an acidic substance selected from the class consisting of carboxylic acids and carboxylic acid anhydrides, said metal oxide and said acidic substance being present in amounts, respectively, equivalent chemically to at least one-half and at least one-fourth said combined —COOH of said rubbery material, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic rubbery material.

6. The process which comprises preparing a mixture of (1) a plastic synthetic rubbery material containing from 0.001 to 0.30 chemical equivalents by weight of combined —COOH per 100 parts by weight of rubbery material by reacting a plastic interpolymer of an open-chain aliphatic conjugated diene and an olefinically-unsaturated copolymerizable compound containing a group hydrolyzable to a carboxyl group with a hydrolysis agent, (2) a polyvalent metal oxide and (3) an acidic substance selected from the class consisting of carboxylic acids and carboxylic acid anhydrides, said metal oxide and said acidic substance being present in amounts, respectively, equivalent chemically to at least one-half and at least one-fourth said combined —COOH of said rubbery material, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic polymeric material.

7. The process which comprises preparing a mixture of (1) a plastic, synthetic rubbery material containing from 0.001 to 0.30 chemical equivalents by weight of combined —COOH per 100 parts by weight of rubbery material by the polymerization of a monomeric mixture comprising a major proportion of butadiene-1,3 and a minor proportion of an olefinically-unsaturated carboxylic acid characterized by possessing at least one olefinic carbon to carbon double bonds and at least one carboxyl group, (2) a polyvalent metal oxide and (3) a carboxylic acid, each of said metal oxide and said carboxylic acid being present in amounts at least equivalent chemically to one-half said combined —COOH of said rubbery material, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic rubbery material.

8. The process which comprises preparing a mixture of (1) a plastic synthetic rubbery material containing from 0.001 to 0.30 chemical equivalents by weight of combined —COOH per 100 parts by weight of rubbery material by the polymerization in an acidic aqueous emulsion of a monomeric mixture comprising a major proportion of butadiene-1,3 and a minor proportion of methacrylic acid, (2) a polyvalent metal oxide and (3) a carboxylic acid, each of said metal oxide and said carboxylic acid being present in amounts at least equivalent chemically to one-half said combined —COOH of said rubbery material, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic rubbery material.

9. The process which comprises preparing a mixture of (1) a plastic, synthetic rubbery material containing from 0.001 to 0.30 chemical equivalents by weight of combined —COOH per 100 parts by weight of rubbery material by reacting a plastic interpolymer prepared by the polymerization of a monomeric mixture comprising a major proportion of butadiene-1,3 and a minor proportion of acrylonitrile with a hydrolysis agent, (2) a polyvalent metal oxide and (3) an acidic substance selected from the class consisting of carboxylic acids and carboxylic acid anhydrides, each of said metal oxide and said acidic substance being present in amounts at least equivalent chemically to one-half said combined —COOH of said rubbery material, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic rubbery material.

10. The process which comprises preparing a mixture of (1) a plastic, synthetic rubbery material containing from 0.001 to 0.30 chemical equivalents by weight of combined —COOH per 100 parts by weight of rubbery material by the polymerization in an acidic aqueous emulsion of a monomeric mixture comprising a major proportion of butadiene-1,3 and a minor proportion of acrylic acid, (2) a polyvalent metal oxide and (3) a carboxylic acid, each of said metal oxide and said carboxylic acid being present in amounts at least equivalent chemically to said combined —COOH of said rubbery material, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic rubbery material.

11. The process which comprises preparing a mixture of (1) a plastic synthetic rubbery material containing from 0.001 to 0.30 chemical equivalents by weight of combined —COOH per 100 parts by weight of rubbery material by the polymerization in an acidic aqueous emulsion of a monomeric mixture comprising a major proportion of butadiene-1,2 and a minor proportion of sorbic acid, (2) a polyvalent metal oxide and (3) a carboxylic acid, each of said metal oxide and said carboxylic acid being present in amounts at least equivalent to one-half said combined —COOH of said rubbery material, and then heating the resulting plastic composition at a temperature of from 125 to 400° F. until said plastic composition has been converted to an elastic polymeric metallo-carboxylate by salt formation between the metallic cation of said metal oxide and the combined —COOH groups of the plastic rubbery material.

12. The method of claim 9 in which the polyvalent metallic oxide is zinc oxide.

13. The method of claim 10 in which the polyvalent metallic oxide is zinc oxide and the acidic substance is stearic acid.

14. The method of claim 11 in which the polyvalent metallic oxide is zinc oxide and the acidic substance is phthalic anhydride.

HAROLD P. BROWN.

References Cited in the file of this patent

UNITED STATES PATENTS

| Number | Name | Date |
|---|---|---|
| 2,234,204 | Starkweather et al. | Mar. 11, 1941 |
| 2,395,506 | Sauser | Feb. 26, 1946 |
| 2,416,060 | McAlevy et al. | Feb. 18, 1947 |